United States Patent [19]
Gibson et al.

[11] Patent Number: 5,894,030
[45] Date of Patent: Apr. 13, 1999

[54] DEVICE AND METHOD FOR MANUFACTURING FROZEN AERATED PRODUCTS

[75] Inventors: William C. Gibson; William E. French; Paul W. Schwartz, all of Marysville, Ohio

[73] Assignee: Nestec S. A., Vevey, Switzerland

[21] Appl. No.: 08/876,811

[22] Filed: Jun. 17, 1997

[51] Int. Cl.[6] .................................. A23L 1/00; A23G 9/00
[52] U.S. Cl. .......................... 426/524; 62/63; 62/342; 99/455; 366/328.2; 366/330.1; 426/519; 426/565
[58] Field of Search ........................ 426/524, 519, 426/565, 474; 62/63, 342, 343; 99/455; 165/156; 366/328.2, 330.1

[56] References Cited

U.S. PATENT DOCUMENTS

| | | | |
|---|---|---|---|
| 3,846,570 | 11/1974 | Better | 426/524 |
| 5,030,465 | 7/1991 | Curry et al. | 426/524 |

*Primary Examiner*—George Yeung
*Attorney, Agent, or Firm*—Pennie & Edmonds LLP

[57] ABSTRACT

A device for the manufacture of a frozen aerated product which includes a freezer, a pump for introducing a frozen aerated product mix and air into the freezer, a tubular crystallizer system having upstream and downstream ends and having a longitudinal shaft within and extending beyond the ends of the crystallizer system through seals, a ram for reciprocating the longitudinal shaft upstream and downstream, the longitudinal shaft being provided with one or more scrapers in a transverse plane along its length which divide the crystallizer system into compartments, whose perimeters are adjacent to and capable of scraping the internal wall of the crystallizer system and whose bodies are provided with at least one longitudinal channel, a high pressure stuffing pump for feeding the frozen aerated product from the freezer to the crystallizer system, a jacket containing a heat transfer fluid for removing heat from the frozen aerated product within the crystallizer system, and a backpressure valve for conveying the frozen aerated product out of the crystallizer system.

20 Claims, 6 Drawing Sheets

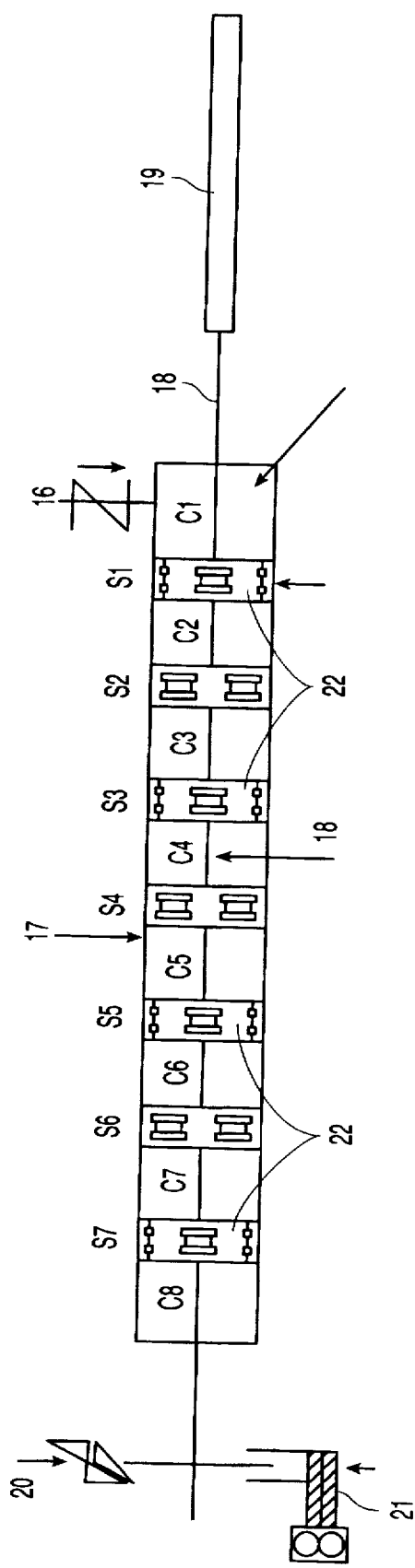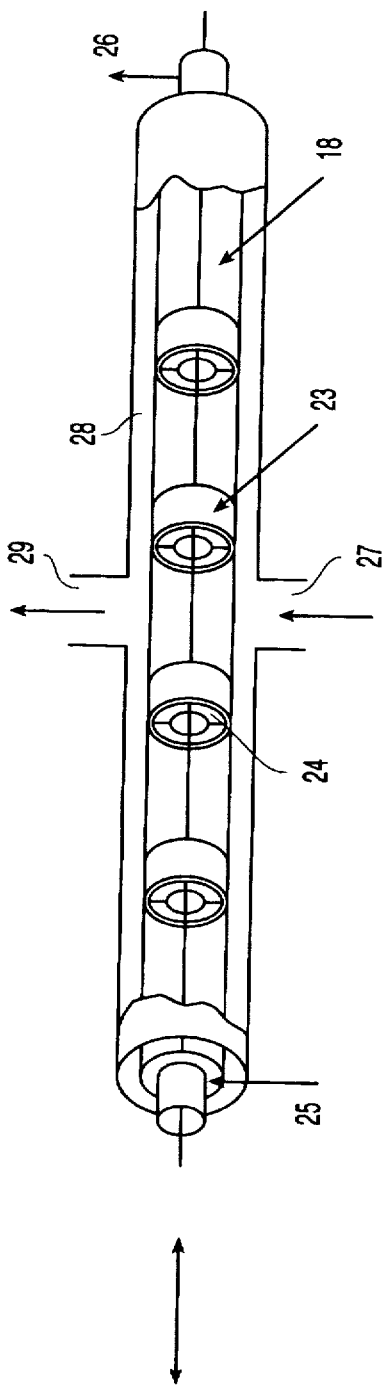
FIG. 2
FIG. 3

DEVICE AND METHOD FOR MANUFACTURING FROZEN AERATED PRODUCTS

FIELD OF THE INVENTION

The present invention relates to a device and method for the manufacture of frozen aerated products, e.g. frozen desserts or ice cream.

BACKGROUND OF THE INVENTION

Conventionally, frozen aerated products such as ice cream are manufactured by methods which comprise mixing the ingredients, homogenizing, pasteurizing, freezing, forming/filling, and hardening the frozen mixture. Aeration of the mixture or expansion is carried out at the freezing stage, the proportion of air used being such that the volume increases by 10 to 120%. On leaving the freezer, the temperature of the aerated mass is typically about $-5°$ to $-6°$ C. This is then hardened to $-40°$ to $-45°$ C. in a hardening chamber until the core temperature of the product reaches $-18°$ C. or less for bulk products, or $-30°$ C. for extruded products in bars.

Attempts have been made to lower the temperature of the aerated mass leaving the freezer to below $-6°$ C., both for energy savings and with the aim of improving the texture, for example to obtain greater smoothness. However, with conventional equipment, insurmountable problems of high viscosity of the mass of ice cream at temperatures below $-7°$ to $-8°$ C. are encountered. These problems have been partly resolved by using two scraped surface freezers in series, the first, which is conventional, delivering aerated ice cream at about $-7°$ C., and the second being specifically designed to process the highly viscous mass to lower its temperature to about $-10°$ C. However, it would be desirable to obtain an even lower temperature of the aerated mass and the present invention attempts to make this possible.

SUMMARY OF THE INVENTION

According to the present invention there is provided a device for the manufacture of a frozen aerated product which comprises a freezer, means for introducing a frozen aerated product mix and air into the freezer, a tubular crystallizer system having upstream and downstream ends and comprising a longitudinal shaft within and extending beyond the ends of the crystallizer system through seals, means for reciprocating the longitudinal shaft upstream and downstream, the longitudinal shaft being provided with one or more scrapers in a transverse plane along its length which divide the crystallizer system into compartments, whose perimeters are adjacent to and capable of scraping the internal wall of the crystallizer system and whose bodies are provided with at least one longitudinal channel, means for feeding the frozen aerated product from the freezer to the crystallizer system, means for removing heat from the frozen aerated product within the crystallizer system, and means for conveying the frozen aerated product out of the crystallizer system.

BRIEF DESCRIPTION OF THE DRAWINGS

FIG. 2 is a side view of a tubular crystallizer for use in the system of FIG. 1;

FIG. 3 is a cross-sectional view of a tubular crystallizer having four internal scrapers;

DETAILED DESCRIPTION OF THE PREFERRED EMBODIMENTS

Figure 1:
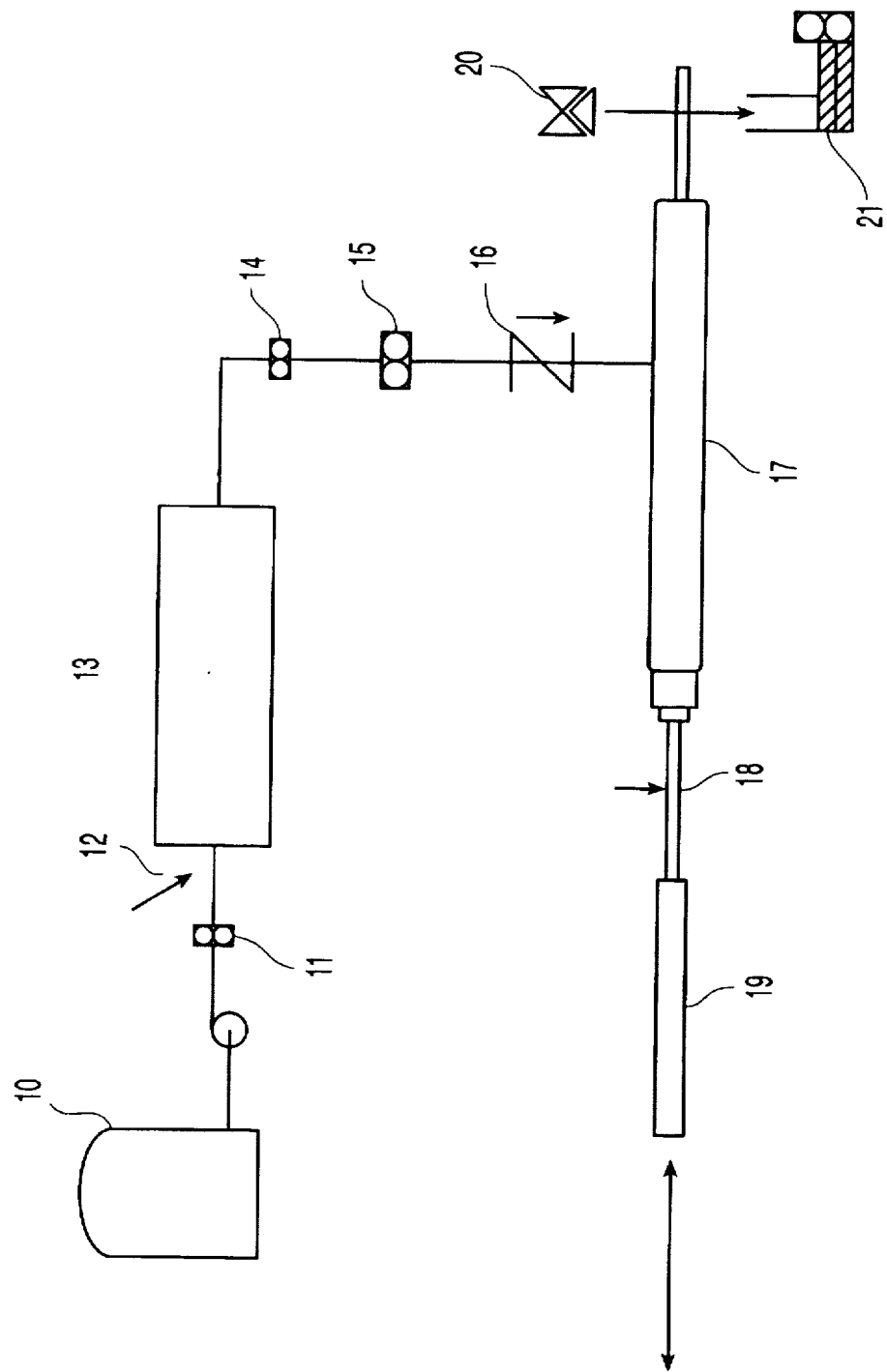
FIG. 1 is a diagrammatic representation of a system for the manufacture of ice cream according to the present invention.

The freezer may be any conventional freezer used for freezing ice cream such as a scraped surface freezer which is capable of reducing the temperature of the frozen aerated product to about $-7°$ C. Alternatively, the freezer may be a tubular crystallizer system as described above. The means for introducing the frozen aerated product mix into the freezer may conveniently be a feed pump. The air may be introduced into the frozen aerated product mix, e.g. from a plant air compressor, either directly into the freezer or via a high speed dispersal prior to the freezer.

The crystallizer system may comprise a heat transfer tube or a plurality of heat transfer tubes arranged in series. The crystallizer system is preferably circular in cross section. A circular cross-section is the most practical to fabricate, is easiest to design from a sanitary perspective and is most efficient as a pressure vessel. It may have a length from 2 to 30 times the diameter depending on the product requirements. The seals through which the longitudinal shaft extends through the ends of the crystallizer system should preferably be sanitary seals. If desired, a plurality of crystallizer systems may be used in parallel or in stages.

The means for reciprocating the longitudinal shaft may be provided by a hydraulic, pneumatic or mechanically operated ram. Depending on the diameter of the shaft, the working volume within the crystallization system is held constant, is increased or decreased during either the upstream or downstream stroke.

The number of scrapers depends on the length of the crystallizer system and the spacing between the scrapers, e.g. there may be from 1 to 40 scrapers. The shape, width, material and the number of scrapers may vary depending on the type of product in order to facilitate mixing and assist in pumping the highly viscous product produced as additional water is frozen out. Examples of suitable materials of construction of the scrapers are stainless steel or an engineering thermoplastic such as DELRIN or NYLON. The longitudinal channels within the scrapers may be designed to deliver the required shear and degree of mixing depending on the product, e.g. to minimize mixing and internal pumping on products where low shear is desired such as high fat products: in this case, the feed pump may supply the pressure necessary to force the frozen aerated product through the crystallizer system. The longitudinal channels may be internal channels completely enclosed within the body of the scraper or they may be surface channels communicating with the exterior of the perimeter wall of the scraper. If desired, scrapers with one-way check valves in the channels or split pistons may be used depending on the material being processed. A split piston may, for instance, be split radially except for the shaft passage which would remain a constant diameter. With a split piston scraper, the diameter of the scraper increases during either the downstream or upstream stroke thus ensuring intimate contact between the inside wall of the crystallizer system and the outside edge of the split piston scraper.

The means for feeding the frozen aerated product from the freezer to the crystallizer system may conveniently be a high pressure stuffing pump.

Advantageously, means are provided for the aerated frozen product from the freezer to enter the crystallizer system at the upstream end conveniently through a high pressure sanitary check valve.

The means for removing heat from the frozen aerated product within the crystallizer system may be provided by liquid ammonia or brine circulating on the outside of the crystallizer system. The removal of heat results in ice crystal growth on the internal wall of the crystallizer system.

The frozen aerated product is preferably conveyed out of the crystallizer system at the downstream end, conveniently through a backpressure valve, advantageously adjusted to maintain a maximum outlet pressure of from 30 to 750 psig and preferably from 50 to 375 psig depending on the product.

The present invention also provides a method for the manufacture of a frozen aerated product which comprises introducing a frozen aerated product mix and air into a freezer, feeding the frozen aerated product via a valve from the freezer to the upstream end of a tubular crystallizer system having upstream and downstream ends and comprising a longitudinal shaft extending beyond the ends of the crystallizer system through seals, the longitudinal shaft being provided with one or more scrapers in a transverse plane along its length capable of dividing the crystallizer system into compartments, whose perimeters are adjacent to and capable of scraping the internal wall of the crystallizer system and whose bodies are provided with at least one longitudinal channel, reciprocating the longitudinal shaft in a longitudinal direction so that on the downstream stroke, frozen aerated product from the freezer enters the upstream compartment of the crystallizer system and frozen aerated product in the downstream compartment is pushed out of the crystallizer system by the scraper at the downstream end, and on the upstream stroke, frozen aerated product upstream of a scraper traverses the longitudinal channel to a position downstream of the scraper, and removing heat from the frozen aerated product within the crystallizer system.

The longitudinal channels in the scrapers are preferably provided with one-way valves to allow flow from the upstream to the downstream side of a scraper.

The pulsation of the discharge may be controlled by the use of an outlet accumulator with pump, several crystallizers in parallel, or by varying the sizes of the inlet and outlet shafts.

By means of this invention, it is possible that draw temperatures low enough to eliminate hardening may be achieved through optimal barrel and scraper design.

Referring to the drawings, FIG. 1 shows a mix feed tank 10, a mix feed pump 11, aa air supply 12, a conventional scraped surface freezer 13, an ice cream pump 14, a high pressure stuffing pump 15, a pneumatically actuated high pressure sanitary check valve 16, a crystallizer system 17 made of one heat transfer tube, a longitudinal shaft 18 driven by a pneumatic or hydraulic ram 19, an outlet backpressure valve 20 and an outlet accumulator with pump 21. FIG. 2 shows a pneumatically actuated high pressure sanitary check valve 16, a longitudinal shaft 18 driven by a pneumatic or hydraulic ram 19, an outlet backpressure valve 20, an outlet accumulator with pump, scrapers S1–S7 with enclosed flow channels 22, and compartments C1–C8. FIG. 3 shows a scraper shaft 18, scrapers 23 with longitudinal channels 24, mix inlet 25, product outlet 26, inlet for liquid ammonia 27, cooling jacket 28 and an outlet for ammonia vapor 29.

In operation, ice cream mix is pumped from the feed tank 10 by the feed pump 11 to the scraped surface freezer 13. Air 12 is introduced directly into the scraped surface freezer 13. From the scraped surface freezer 13, a stream of frozen product at −7° C. containing approximately 50% water frozen and up to 150% overrun is pumped through the pump 14 to the high pressure stuffing pump 15 which supplies the pressure to feed the crystallizer system 17. The aerated frozen product from the high pressure stuffing pump 15 enters the crystallizer system 17 through the pneumatically actuated high pressure sanitary check valve 16.

During the downstream (push) stroke of the shaft 18, the upstream scraper S1 travels downstream from a position adjacent the upstream end of the crystallizer system to create the upstream compartment C1 and the check valve 16 allows flow of the aerated frozen product into the upstream compartment C1. At the same time, scrapers S1 to S6 push the ice cream in compartments C2 to C7 the distance of one stroke while the downstream scraper S7 travels to the downstream end of the crystallizer system causing the downstream compartment C8 to become smaller, thus forcing the ice cream out of the crystallizer system through the outlet backpressure valve 20 (pressure 100 psig) and into the outlet accumulator with pump 21 to be pumped continuously further downstream. At the end of the downstream (push) stroke, upstream compartment C1 is full (together with compartments C2–C7) and downstream compartment C8 is empty while a proximity switch (not shown) signals the check valve 16 to close.

During the upstream (pull) stroke of the shaft 18, the shaft and scrapers S1–S7 travel upstream causing the volume in compartment C1 to decrease. This increases the pressure within the compartment until the pressure required to force the contents in compartment C1 through the flow channels 22 in scraper S1 into compartment C2 is reached whereupon compartment C1 is emptied. At the same time, the ice cream in the compartments C2–C7 is forced through the flow channels 22 in scrapers S2–S7 into compartments C3–C8. Compartment C8 which emptied on the downstream (push) stroke is thus refilled.

As shown in FIG. 3, liquid ammonia enters the cooling jacket 28 through inlet 27 and removes heat from the ice cream which results the formation of ammonia vapor which leaves the cooling jacket at outlet 29 and in the formation of ice crystal growth along the inside surface of the crystallizer system 17. During reciprocation of the shaft 18, the flow of ice cream through the flow channels 22 facilitates the mixing of the ice crystals formed along the inside surface of the crystallizer system 17 into the bulk ice cream mass.

With this device and method, draw temperatures of −13° C. have been achieved on low fat ice cream recipes and −16° C. on sorbet recipes.

Figure 4:
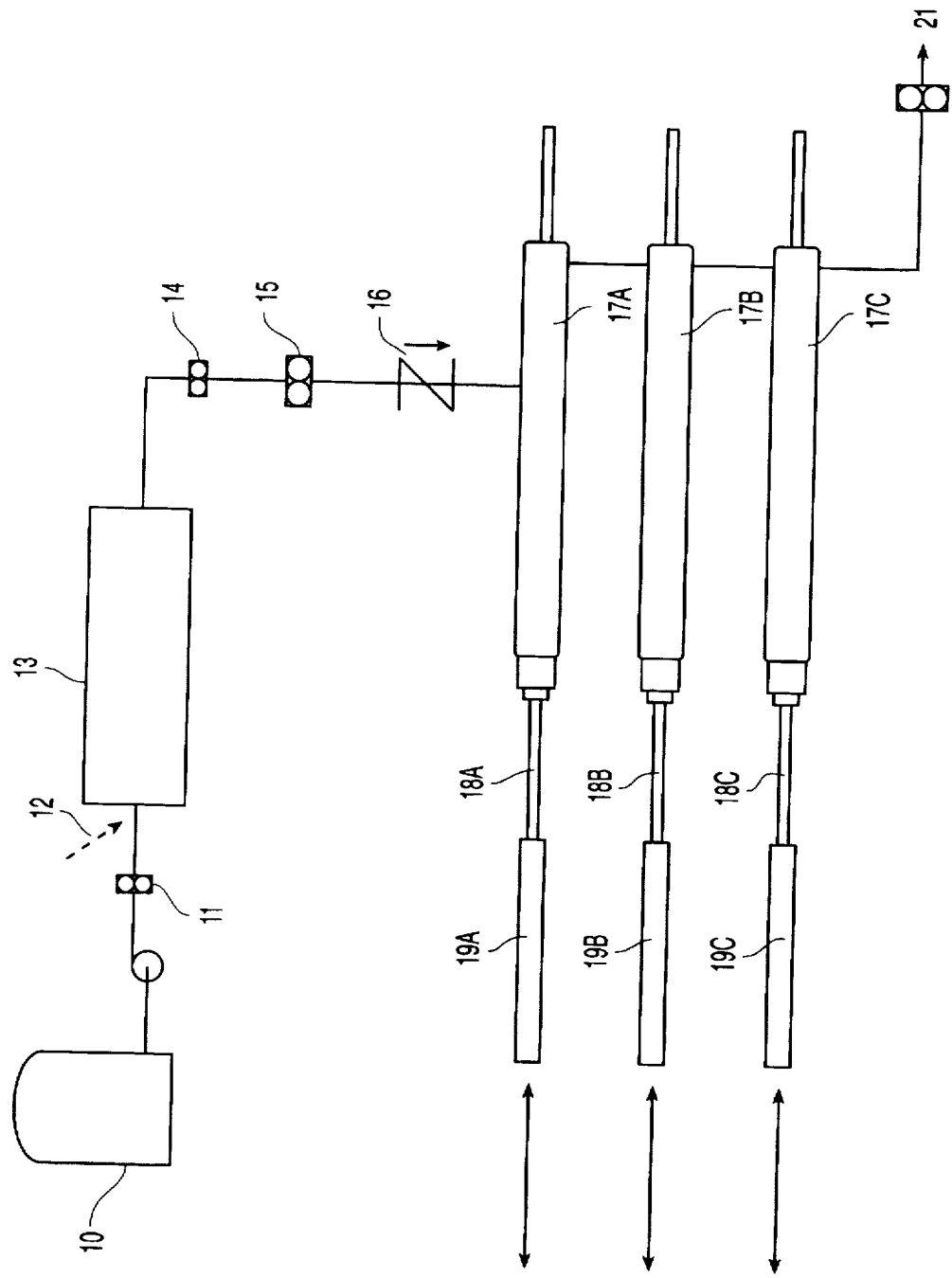
FIG. 4 is a diagrammatic representation of a system for the manufacture of ice cream which system utilizes three crystallizers in parallel.

In FIG. 4, the aerated frozen product from the high pressure stuffing pump 15 is divided into three streams and enters the three crystallizer systems 17A, 17B and 17C through the pneumatically actuated high pressure sanitary check valve 16.

Figure 5:
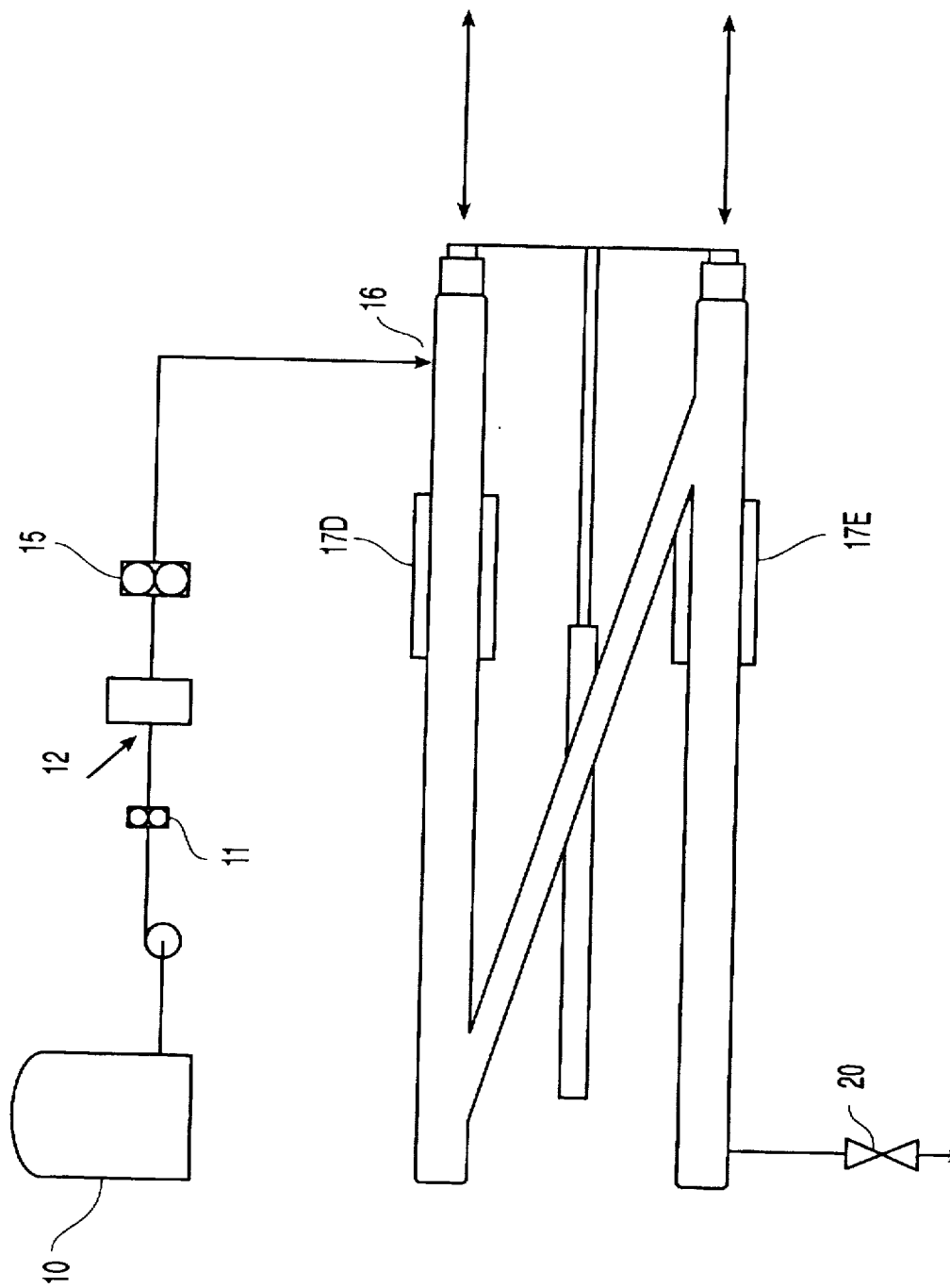
FIG. 5 is a diagrammatic representation of a system for the manufacture of ice cream which system utilizes a two-stage tubular crystallizer where the first stage acts as a freezer.

In FIG. 5, aerated ice cream mix from the high pressure stuffing pump 15 enters the upstream end of the crystallizer system 17D through the pneumatically actuated high pressure sanitary check valve 16 and aerated frozen product leaving the downstream end of the crystallizer system 17D at −7° C. is fed to the upstream end of the crystallizer system 17E where it is further cooled to −13° C. as described with reference to FIG. 2 and forced out through the valve 20.

Figure 6A:
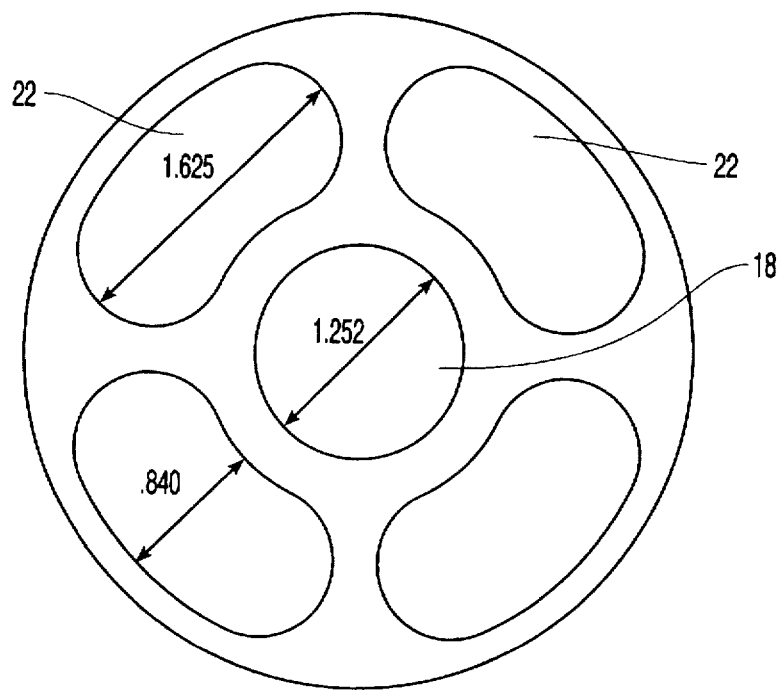
FIGS. 6A and 6B are end and side views of a scraper having longitudinal channels according to the present invention.
Figure 6B:
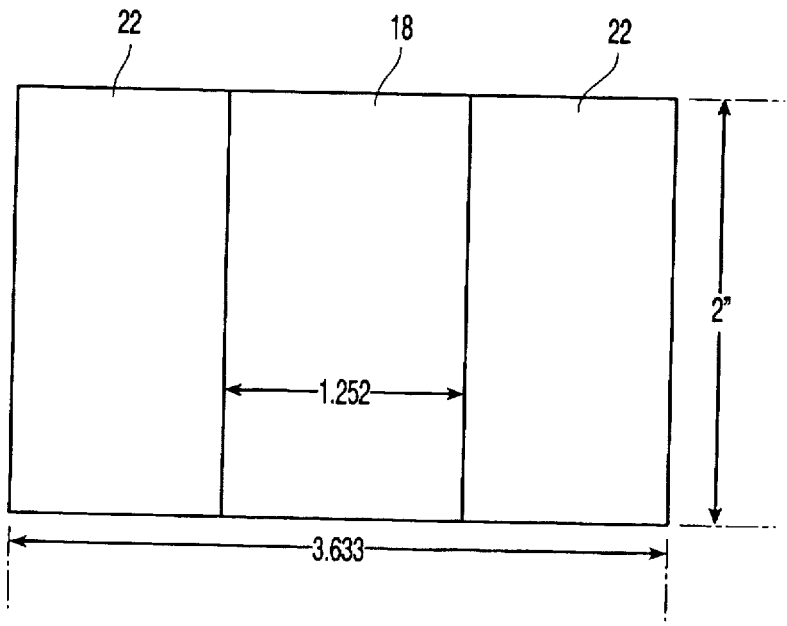
Figure 7A:
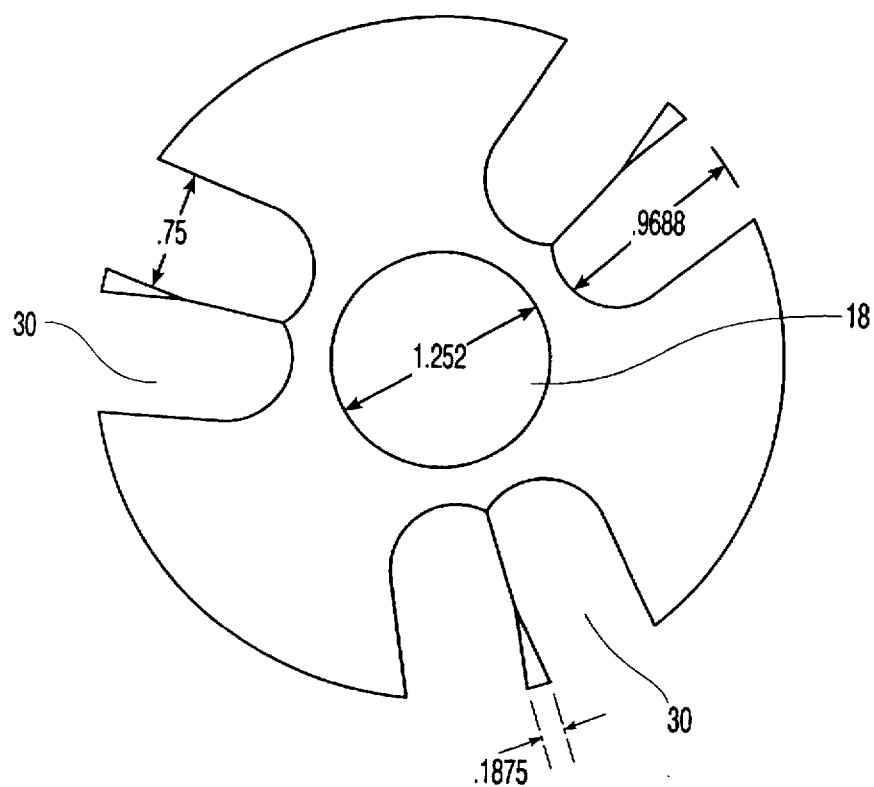
FIGS. 7A and 7B are end and side views of a scraper having open longitudinal channels according to the present invention.
Figure 7B:
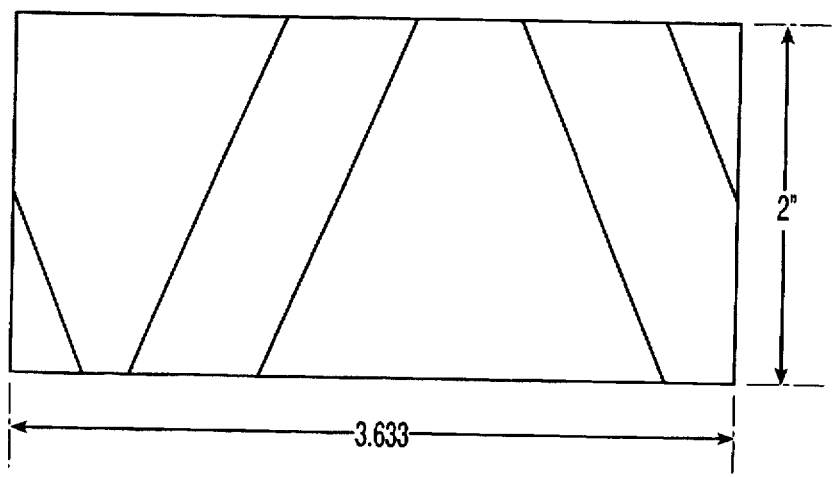

FIGS. 6A and 6B show the enclosed longitudinal channels 22 and the shaft 18 and FIGS. 7A and 7B show the open longitudinal channels 30 and the shaft 18.

What is claimed is:

1. A device for the manufacture of a frozen aerated product which comprises a freezer, means for introducing a frozen aerated product mix and air into the freezer, a tubular crystallizer system having upstream and downstream ends and comprising a longitudinal shaft within and extending beyond the ends of the crystallizer system through seals, means for reciprocating the longitudinal shaft upstream and downstream, the longitudinal shaft being provided with one or more scrapers in a transverse plane along its length, which scrapers divide the crystallizer system into compartments and have (a) perimeters adjacent to and capable of scraping the internal wall of the crystallizer system and (b) bodies provided with at least one longitudinal channel, means for feeding the frozen aerated product from the freezer to the crystallizer system, means for removing heat from the frozen aerated product within the crystallizer system, and means for conveying the frozen aerated product out of the crystallizer system.

2. The device according to claim 1 wherein the freezer is a scraped surface freezer.

3. The device according to claim 1 wherein the crystallizer system comprises a heat transfer tube or a plurality of heat transfer tubes arranged in series.

4. The device according to claim 1 wherein the crystallizer system has a length which is 2 to 30 times its diameter.

5. The device according to claim 1 wherein a plurality of crystallizer systems is used either in parallel or series stages.

6. The device according to claim 1 wherein the number of scrapers is from 1 to 40.

7. The device according to claim 1 wherein the longitudinal channels are either internal channels completely enclosed within the body of the scraper or they are surface channels communicating with the exterior of the perimeter wall of the scraper.

8. The device according to claim 1 wherein the scrapers are split pistons.

9. The device according to claim 1 wherein means are provided for the aerated frozen product from the freezer to enter the crystallizer system at the upstream end.

10. The device according to claim 1 wherein the entry of the frozen aerated product to the crystallizer system is controlled by a pneumatically actuated high pressure sanitary check valve.

11. The device according to claim 1 wherein the means for removing heat from the frozen aerated product within the crystallizer system is provided by liquid ammonia or brine circulating in a jacket on the outside of the crystallizer system.

12. The device according to claim 1 wherein the longitudinal channels in the one or more scrapers are provided with one-way valves to allow flow from the upstream to the downstream side of a scraper.

13. The device according to claim 1 further comprising an outlet accumulator and pump for controlling pulsation and discharge several crystallizers are used in parallel.

14. A method for the manufacture of a frozen aerated product which comprises introducing a frozen aerated product mix and air into a freezer, feeding the frozen aerated product via a valve from the freezer to an upstream end of a tubular crystallizer system comprising upstream and downstream compartments, upstream and downstream ends, and a longitudinal shaft extending beyond the ends of the crystallizer system through seals, the longitudinal shaft being provided with one or more scrapers in a transverse plane along its length capable of dividing the crystallizer system into compartments, the scrapers having perimeters adjacent to and capable of scraping the internal wall of the crystallizer system and bodies provided with at least one longitudinal channel, reciprocating the longitudinal shaft in a longitudinal direction in downstream and upstream strokes so that on the downstream stroke, frozen aerated product from the freezer enters the upstream compartment of the crystallizer system and frozen aerated product in the downstream compartment is pushed out of the crystallizer system by the scraper at the downstream end, and on the upstream stroke, and, on the upstream stroke, frozen aerated product upstream of a scraper traverses the longitudinal channel to a position downstream of the scraper, and removing heat from the frozen aerated product within the crystallizer system.

15. The method according to claim 14 wherein the frozen aerated product from the freezer enters either the upstream compartment of the crystallizer system or an intermediate compartment of the crystallizer system.

16. The method according to claim 14 which further comprises varying the sizes of the inlet and outlet shafts to control the pulsation and discharge of the frozen aerated product.

17. A tubular crystallizer system having upstream and downstream ends and comprising a longitudinal shaft within and extending beyond the ends of the crystallizer system through seals, means for reciprocating the longitudinal shaft upstream and downstream, the longitudinal shaft being provided with one or more scrapers in a transverse plane along its length, which scrapers divide the crystallizer system into compartments and have perimeters adjacent to and capable of scraping the internal wall of the crystallizer system and bodies provided with at least one longitudinal channel, the tubular crystallizer system being provided with cooling means.

18. The tubular crystallizer system according to claim 17 which is further provided with means for feeding the product to the crystallizer system, means for removing heat from the product within the crystallizer system, and means for conveying the product out of the crystallizer system.

19. The method according to claim 14, which further comprises providing one or more of the scrapers with longitudinal channels to allow movement of the frozen aerated product therethrough.

20. The method according to claim 19, which further comprises providing one or more of the scrapers which have longitudinal channels with a one-way valve to allow movement of the frozen aerated product in only one direction.

* * * * *